United States Patent
Giraudon et al.

(10) Patent No.: US 9,298,735 B2
(45) Date of Patent: Mar. 29, 2016

(54) METHOD AND APPARATUS FOR FILTERING PEER-TO-PEER NETWORK SEARCHES FOR LIMITED CAPABILITY DEVICES

(75) Inventors: Caroline Giraudon, Bonrepos sur Aussonnelle (FR); Francois-Xavier Ehrhart, Toulouse (FR); Julien Pince, Toulouse (FR)

(73) Assignee: Google Technology Holdings LLC, Mountain View, CA (US)

( * ) Notice: Subject to any disclaimer, the term of this patent is extended or adjusted under 35 U.S.C. 154(b) by 1298 days.

(21) Appl. No.: 12/377,728

(22) PCT Filed: Oct. 11, 2007

(86) PCT No.: PCT/US2007/081057
§ 371 (c)(1),
(2), (4) Date: Feb. 17, 2009

(87) PCT Pub. No.: WO2008/048842
PCT Pub. Date: Apr. 24, 2008

(65) Prior Publication Data
US 2010/0198842 A1    Aug. 5, 2010

(30) Foreign Application Priority Data
Oct. 19, 2006  (EP) ................................ 06301065

(51) Int. Cl.
*G06Q 20/00*  (2012.01)
*G06F 17/30*  (2006.01)
*H04L 29/08*  (2006.01)

(52) U.S. Cl.
CPC .... *G06F 17/30206* (2013.01); *G06F 17/30106* (2013.01); *H04L 67/104* (2013.01); *H04L 67/1068* (2013.01); *H04L 67/28* (2013.01);
(Continued)

(58) Field of Classification Search
USPC .......................................................... 705/52
See application file for complete search history.

(56) References Cited

U.S. PATENT DOCUMENTS

| 2002/0116533 A1 | 8/2002 | Holliman et al. |
| 2003/0065774 A1* | 4/2003 | Steiner et al. .................. 709/225 |
| 2004/0044790 A1* | 3/2004 | Loach et al. ................... 709/241 |

(Continued)

FOREIGN PATENT DOCUMENTS

| KR | 1020050117542 A | 12/2005 |
| WO |     0153988 A2  | 7/2001 |

(Continued)

OTHER PUBLICATIONS

Stokes, M. "Gnutella2 Specification Document, First Draft" Internet Citation, Mar. 26, 2003, XP002390159.
(Continued)

*Primary Examiner* — John Hayes
*Assistant Examiner* — John M Winter (57) ABSTRACT

A method and apparatus for filtering a peer-to-peer (P2P) search query in a P2P network (100) is provided. A P2P-enabled device (102) generates a P2P search query (404) and appends device capability information to the P2P search query to generate a device-specific P2P search query (412). The device-specific P2P search query is provided (414) to the P2P network (100) and search query results are remotely filtered in response to the device-specific P2P search query to generate filtered search query results for providing to the P2P-enabled device (416).

24 Claims, 6 Drawing Sheets

(52) U.S. Cl.
CPC .......... *H04L 67/2828* (2013.01); *H04L 67/303* (2013.01)

(56) References Cited

U.S. PATENT DOCUMENTS

| | | | |
|---|---|---|---|
| 2004/0181607 A1* | 9/2004 | Xu et al. | 709/239 |
| 2004/0260761 A1 | 12/2004 | Leaute et al. | |
| 2005/0086300 A1 | 4/2005 | Yeager et al. | |
| 2005/0193106 A1 | 9/2005 | Desai et al. | |
| 2005/0197924 A1 | 9/2005 | Janakiraman et al. | |
| 2009/0041155 A1* | 2/2009 | Sugai et al. | 375/299 |
| 2009/0177757 A1* | 7/2009 | Pottenger | 709/219 |

FOREIGN PATENT DOCUMENTS

| | | | |
|---|---|---|---|
| WO | 2005059678 | A2 | 6/2005 |
| WO | 2006069967 | A | 7/2006 |

OTHER PUBLICATIONS

Mohan R, et al, "Content Adapation Framework: Bringing the Interest to Information Appliances" 1999 IEEE Global Telecommunications Conference. Globecom '99, Seamless Interconnection for Universal Services, Dec. 5-9, 1999, pp. 2015-2021, vol. 4, IEEE Global Telecommunications Conference, New York, New York.

Stokes, M. "Gnutella2 Specification documents, First Draft" Mar. 26, 2003, XP002390159.

Mohan R., et al, "Content Adaptation Framework: Bringing the Internet to Information Appliances", 19999 IEEE Global Telecommunicatons Conference, Dec. 5-9, 1999, pp. 2015-2021, vol. 4, XP000951336, New York, New York, USA.

The State Intellectual Proeprty Office of the People's Republic of China. "Notification of the First Office Action", Jan. 25, 2011, pp. 1-72, Chinese Pat. Appln. No. 200780038752.5.

European Patent Office, "Communication", Jun. 20, 2007, pp. 1-8, EPC Pat. Appln No. 06301065.6, Munich, Germany.

Korean Intellectual Property Office, "Non-Final Notice of Preliminary Rejecton" Mar. 3, 2011, pp. 1-3, Korean Pat. Appln. No. 10-2009-7007954.

Patent Cooperation Treaty, "Notification of Transmittal of the International Search Report and the Written Opinion of the International Searching Authority, or the Declaration", Dec. 18, 2007, pp. 1-12, PCT/US2007/081057.

* cited by examiner

| | SUBPACKETS | OVERVIEW | RETRIEVING | PAYLOAD | CHILDREN |
|---|---|---|---|---|---|
| 612 | /LNI/DPRO/DEC | SPECIFY CODEC | RESULTS ENCODED WITH SPECIFIED CODECS | 8-BIT AUDIO, VIDEO AND IMAGE CODECS SEPARATED BY COMMAS | NONE DEFINED |
| 614 | /LNI/DPRO/SSIZE | SPECIFY SCREEN SIZE | VIDEOS & NONREDUCABLE IMAGES THAT FIT SCREEN SIZE | 16-BIT INTEGERS FOR WIDTH & HEIGHT | NONE DEFINED |
| 616 | /LNI/DPRO/DEP | SPECIFY COLOR DEPTH OF SCREEN | IMAGES WITH FEWER COLORS THAN SPECIFIED | STRING FOR IMAGE METADATA XSD FILE FOR COLOR ATTRIBUTE | NONE DEFINED |
| 618 | /LNI/DPRO/IMGSIZE | SPECIFY MAX DECODABLE IMAGE SIZE | IMAGES THAT CAN BE DISPLAYED ON THE DEVICE | 32-BIT INTEGER FOR TOTAL PIXELS | NONE DEFINED |
| 620 | /LNI/DPRO/BR | SPECIFY MAX BIT RATE DECODABLE | VIDEOS WITH LOWER BIT RATE THAN SPECIFIED | 16-BIT OR 32-BIT INTEGER FOR BIT RATE IN KILOBITS/SECOND | NONE DEFINED |
| 622 | /LNI/DPRO/JAVA | SPECIFY JAVA VERSION SUPPORTED | JAVA APPLICATIONS SPECIFIED ; IF PACKET ABSENT, NO JAVA CAPABILITIES | NONE DEFINED | CLDC-CLDCVERSION MIDP-MIDP VERSION CDC-CDC VERSION J2SE-J2SE VERSION |
| 624 | /LNI/DPRO/OS | SPECIFY OPERATING SYSTEM | APPLICATIONS FOR SPECIFIED OPERTAING SYSTEM | NONE DEFINED | NAME-OS NAME VER-OS VERSION PROC- PROCESSOR TYPE |
| 626 | /LNI/DPRO/INPUT | SPECIFY INPUT HARDWARE | JAVA APPLICATIONS USABLE WITH SPECIFIED HARDWARE INPUT TYPE | EITHER "KP" FOR KEYPAD OR "TS" FOR TOUCHSREEN | NONE DEFINED |
| 628 | /LNI/DPRO/CAM | SPECIFY CAMERA RESOLUTION | APPLICATIONS REQUIRING CAMERA WITH RESOLUTION LESS THAN SPECIFIED; IF PACKET ABSENT, NO CAMERA | ONE FLOAT FOR RESOLUTION OF CAMERA IN MEGA-PIXELS | NONE DEFINED |
| 630 | /LNI/DPRO/NOVIB | SPECIFY NO VIBRATOR | APPLICATIONS NOT REQUIRING A VIBRATOR | NONE DEFINED | NONE DEFINED |
| 632 | /LNI/DPRO/NOGPS | SPECIFY NO POSITIONING CAPABILITIES | APPLICATIONS NOT REQUIRING POSITIONING CAPABILITIES | NONE DEFINED | NONE DEFINED |
| 634 | /LNI/DPRO/DRM | SPECIFY DRM'S UNDERSTOOD | MEDIA NOT DIGITAL RIGHT MANAGEMENT(DRM) PROTECTED OR PROTECTED WITH DRM VERSION SPECIFIED OR EARLIER VERSION | STRING FOR DRM VERSION UNDERSTOOD BY DEVICE | NONE DEFINED |

*FIG. 6*

METHOD AND APPARATUS FOR FILTERING PEER-TO-PEER NETWORK SEARCHES FOR LIMITED CAPABILITY DEVICES

FIELD OF THE INVENTION

The present invention generally relates to devices capable of communications with peer-to-peer networks, and more particularly relates to a method and apparatus for filtering peer-to-peer network searches for devices having limited capabilities.

BACKGROUND OF THE INVENTION

Peer-to-Peer (P2P) applications such as Shareaza, Limewire, Gnucleus and Gnutella2, referred to as P2P clients, enable a user to send a search query for a file or files through a P2P network in order to find the file(s). When the file(s) that the user is searching for is found, query responses returned to the user inform the user where to find the files. Using the query responses, the user can download one or several of the file(s) onto his device. For devices that have limited capabilities, such as wireless communication devices, the device may be unable to access or play the downloaded file because of limited memory, insufficient processing capacity, not the right codec or not the right user interface device, such as a display having a particular display size. Accordingly, downloading files that are user inaccessible on a particular device because of limited capabilities thereof both frustrates the user and utilizes, thereby wasting, valuable battery life, network bandwidth and/or processing capacity.

Thus, what is needed is a method and apparatus for automatically filtering peer-to-peer network searches such that all files downloaded to a device can be accessed (e.g., played or viewed) by a user of that device. Furthermore, other desirable features and characteristics of the present invention will become apparent from the subsequent detailed description of the invention and the appended claims, taken in conjunction with the accompanying drawings and this background of the invention.

BRIEF DESCRIPTION OF THE DRAWINGS

The present invention will hereinafter be described in conjunction with the following drawing figures, wherein like numerals denote like elements.

FIG. 6 is a table of a file sharing network subpackets and related explanatory information in accordance with the embodiment of the present invention where there is an existing chat group call.

DETAILED DESCRIPTION OF THE INVENTION

A method for filtering a peer-to-peer (P2P) search query in a P2P network generates a P2P search query by a P2P-enabled device in the P2P network and appends device capability information to the P2P search query to generate a device-specific P2P search query. The device-specific P2P search query is provided to the P2P network and search query results are remotely filtered in response to the device-specific P2P search query to generate filtered search query results for providing to the P2P-enabled device.

An apparatus for advantageously receiving filtered P2P search query results from a P2P network includes P2P communication circuitry and a controller. The P2P communication circuitry provides a device-specific P2P search query to a P2P network. The controller is coupled to the P2P communication circuitry and provides the device-specific P2P search query thereto. The controller includes a P2P client for appending device capability information to a generated P2P search query to generate the device-specific P2P search query. And the P2P communication circuitry receives filtered search query results generated by remotely filtering search query results in response to the device-specific P2P search query.

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
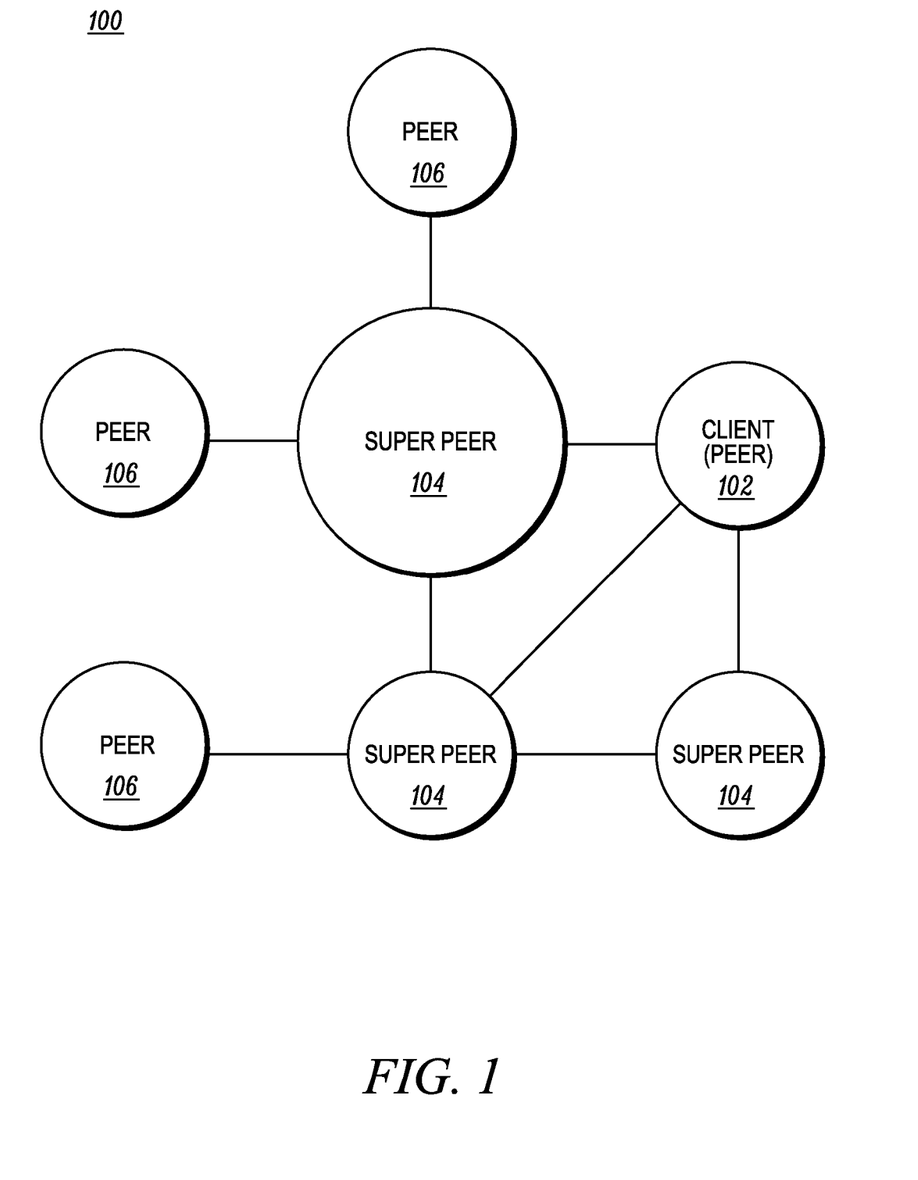
FIG. 1 is a diagram of a peer-to-peer (P2P) network in accordance with an embodiment of the present invention.

Referring to FIG. 1, Peer-to-Peer (P2P) applications is a technology that can use the resources of many connected devices 102, 104 106 to distribute content widely within an ad hoc P2P network 100 without the need of central servers, i.e., each device 102, 104, 106 connected to the P2P network 100 performs some capabilities for the P2P network 100 and each device 102, 104, 106 can act as clients or servers. Some devices 104 are more powerful and more stable than other devices 102, 106. These devices 104, sometimes referred to as "super peers", are generally tasked as servers and serve as local hubs for the less powerful devices 102, 106. A client device 102 in a P2P network 100 is typically connected to three super peers 104 but may be connected to more. The number of connections for the client device 102 may be limited due to power conservation concerns of the client device 102. For example, if the client device 102 is a mobile client device 102 operating on battery power, the mobile client 102 may be limited to no more than five local hub 104 connections at a time.

P2P applications such as Shareaza, Limewire, Gnucleus and Gnutella2, referred to as P2P clients, enable a client device 102 to query for and receive files from the ad hoc P2P network 100. For example, a client device 102 may generate a Gnutella2 formatted search query which sends commonly understood Gnutella2 packets through known text transportation protocols to the devices 104, 106 in the P2P network 100. When the file(s) that the client device 102 is searching for is found, query responses returned to the client device 102 inform the client device 102 where to find the files. Using the query responses, the client device 102 downloads one or several of the file(s) onto the client device 102.

In accordance with one embodiment of the present application, the search query generated by the client device 102 is a device-specific P2P search query including device capability information specific to the client device 102 in a Guntella2 formatted subpacket. The search query results are advantageously filtered remote from the client device 102 (i.e., at, for example, a local hub 104) in response to device-specific P2P search query such that only filtered search query results meeting the device capabilities of the client device 102 are provided thereto.

P2P applications have been typically installed on devices 104, 106 on the wired Internet, mainly on personal computers. As mobile wireless communication devices, such as cellular phones, and other small devices, such as personal digital assistants (PDAs), are gaining computing power, P2P applications can be adapted for use on such devices. In accordance with the embodiments of the present invention described herein, the client device 102 is a wireless communication device 102 coupled to the P2P network 100. However, as will be clear to those skilled in the art after reviewing the teachings of the invention herein, the client device 102 may be a wireless communication device, a portable device such as a PDA, or a wired device such as a personal computer which supports communicating through the Internet by a defined internet protocol on a connection such as an Ethernet connection, a wireless local area network connection such as WiFi or WiMax, a Bluetooth connection, or a wireless wide area network connection such as WCDMA or GSM (using, for example, General Packet Radio Service (GPRS)).

Figure 2:
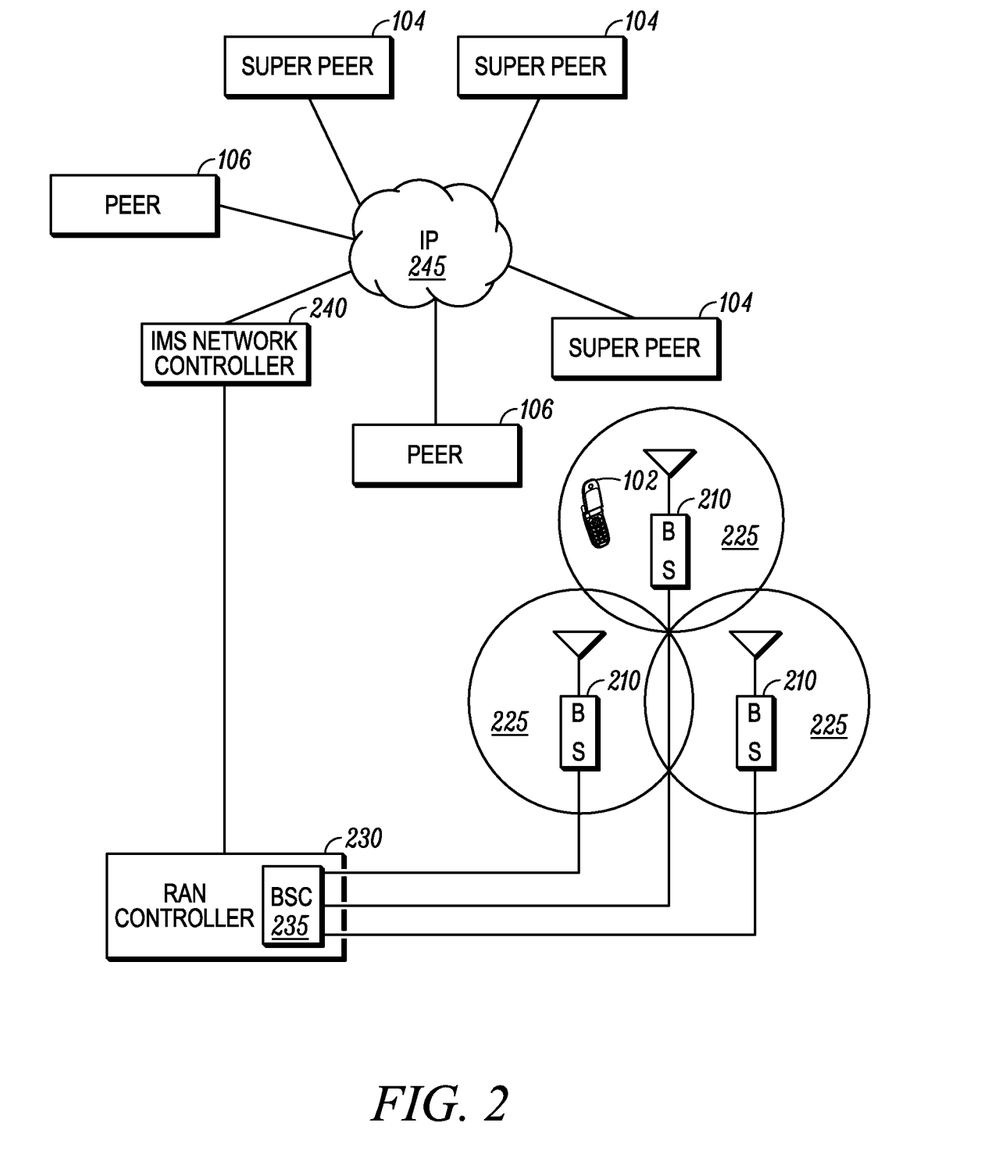
FIG. 2 is a diagram of a wireless communication system enabling communication in the P2P network of FIG. 1 in accordance with the embodiment of the present invention

Referring to FIG. 2, a wireless communication system 200 in accordance with the embodiment of the present invention includes a plurality of base stations 210 and a wireless communication device 102, such as a wireless communication device enabled for P2P network communication. The plurality of base stations 210 communicate with the wireless communication device 102 via radio frequency (RF) signals. Associated with each of the plurality of base stations 210 is a coverage area or cell 225 wherein the wireless client device 102 can receive signals from and transmit signals to such one of the plurality of base stations 210.

The plurality of base stations 210 are coupled to a radio access network controller 230 for control of communications in the wireless communication system 200. In particular, the plurality of base stations 210 are coupled to a base station controller 235 of the radio access network controller 230 which controls signaling with each of the plurality of base stations 210. The radio access network controller 230 can access the base station controller 235 to determine which cell 225 of the wireless communication system 200 a mobile client device 102 is located in by determining which one of the plurality of base stations 210 is receiving RF signals from the wireless client device 102.

The radio access network controller 230 is coupled to an internet protocol (IP) multimedia subsystem (IMS) network controller 240. The IMS network controller 240 is an internet server for control of communications between the radio access network and the internet 245. Thus, the mobile client device 102 can connect to a P2P network 100 (FIG. 1) through the IMS network controller 240. In addition, the IMS controller 240 could establish and maintain communications with another mobile IP-enabled device by coupling to another IMS controller. In accordance with the embodiment of the present invention, the wireless client device 102 couples to the super peer devices 104 and other peer devices 106 for establishing and maintaining the P2P communication network 100.

Figure 3:
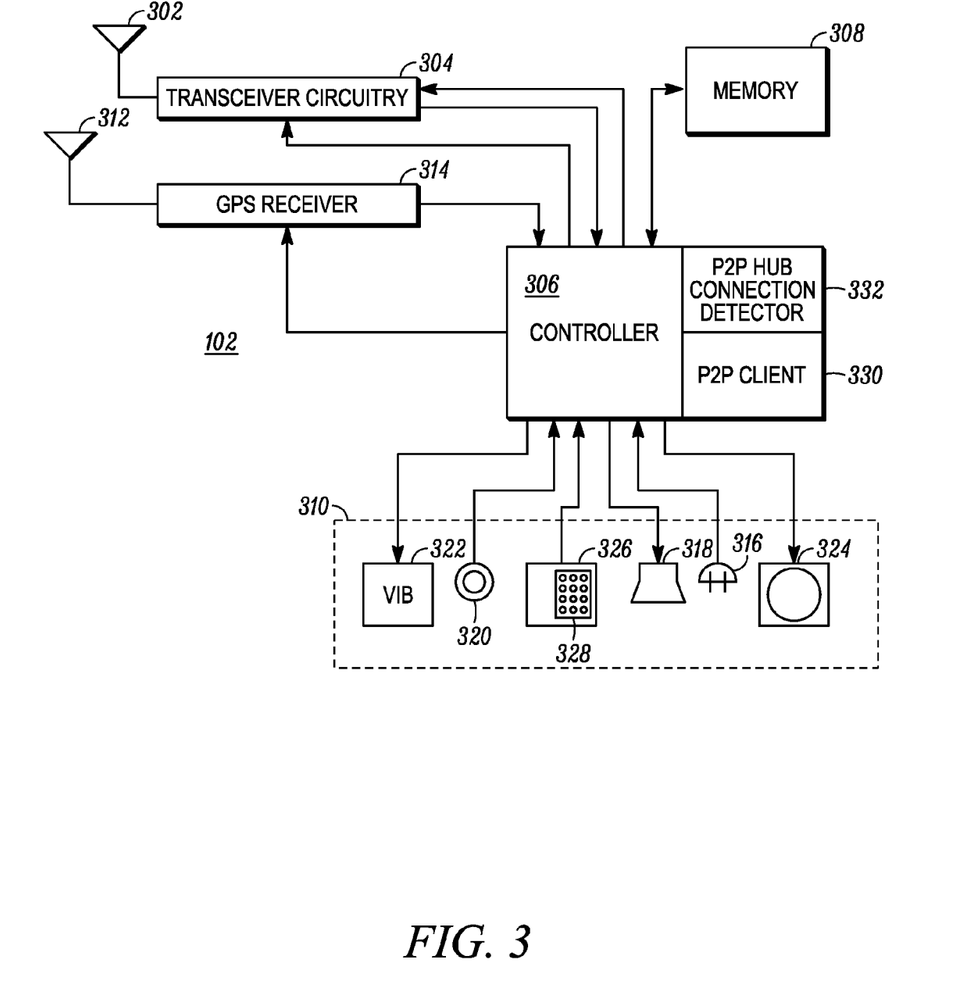
FIG. 3 is a block diagram of a wireless communication device for communicating in the wireless communication system of FIG. 2 and the P2P network of FIG. 1 in accordance with the embodiment of the present invention.

Referring to FIG. 3, in accordance with the embodiment of the present invention the wireless client device 102 is a wireless communication device and includes an antenna 302 for receiving and transmitting radio frequency (RF) signals. Transceiver circuitry 304 is coupled the antenna 302 and, in a manner familiar to those skilled in the art, demodulates and decodes the RF signals received from the base stations 210 (FIG. 2) to derive information therefrom and provides the decoded information thereto to a controller 306 for utilization thereby in accordance with the function(s) of the mobile client device 102. The controller 306 also provides information to the transceiver circuitry 304 for encoding and modulating information into RF signals for transmission from the antenna 302. The controller 306 provides control signals to the transceiver circuitry 304 for control of the operation thereof. In addition, the transceiver circuitry 304 can include additional circuitry for transceiving signals from various networks including multiple types of cellular phone networks such as a WCDMA networks and GSM networks as well as local area wireless networks such as a WiFi networks, and the control signals from the controller 306 control the operation of the transceiver circuitry 304 among and between these various systems.

In addition, the wireless client device 102 in accordance with the embodiment of the present invention is enabled for receiving Global Positioning System (GPS) satellite signals and includes a GPS antenna 312 for receiving the GPS signals coupled to a GPS receiver 314 for deriving GPS location information therefrom and providing the information to the controller 306 for utilization thereby. The controller 306 also provides a control signal to the GPS receiver 314 for activation thereof in accordance with conventional GPS operations in a wireless communication device 102.

As is well-known in the art, the controller 306 is typically coupled to a memory device 308 and a user interface 310 to perform the functions of the mobile client device 102 including the wireless communication functions and the IP/IMS functions. The memory device 308 is a non-volatile memory for storing device capability information for use in accordance with the embodiment of the present invention. The device capability information could be hard-coded into the memory device 308 by the manufacturer of the wireless client device 102 or can be entered by a user of the wireless client device 102. The user interface 310 includes a microphone 316, a speaker 318, a camera 320, a vibrator 322 and a display 324 which may be designed to accept touch screen inputs. The user interface 310 also includes one or more key inputs 326, including a keypad 328.

The wireless client device 102 can communicate with other wireless communication devices in the radio access network managed by the radio access network controller 230. In addition, the wireless client device 102 is an IMS-enabled wireless communication device and can participate in multimedia IP communication sessions, such as P2P network 100 communication sessions, via the IMS network controller 240 (FIG. 2). The wireless client device 102 can join P2P networks 100 through activation of a P2P client application 330 in the controller 306. For example, a P2P client application such as Gnutella2 enables a user of the wireless client device 102 to send a search query for a file or files through the P2P network 100 in order to find the requested file(s). In accordance with the embodiment of the present invention, the controller 306 also includes a P2P hub connection detector 332 which operates to detect connection of the mobile client device 102 with a super peer device 104 which acts as a local P2P hub in the P2P network 100.

Figure 4:
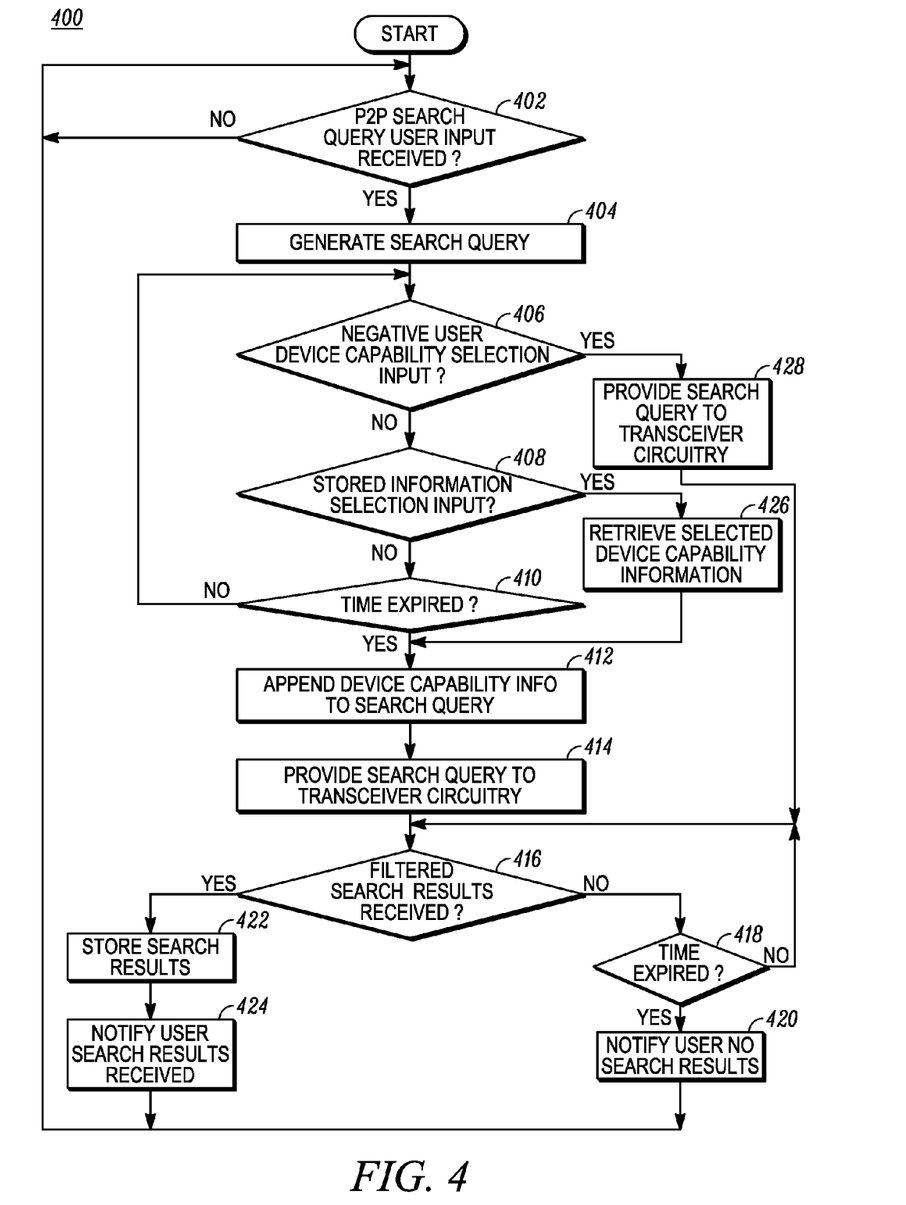
FIG. 4 is a flow diagram of a P2P search query operation of a P2P client of the wireless communication device of FIG. 3 in accordance with an embodiment of the present invention.

Referring to FIG. 4, a flowchart 400 of the operation of the P2P client 330 in accordance with an embodiment of the present invention is shown. Processing initially awaits notification of reception by the controller 306 of a P2P search query user input 402. When the controller 306 provides the P2P client 330 with a user input of a P2P search inquiry 402, the P2P client 330 generates a P2P search query 404 and determines whether additional user inputs regarding the P2P search query have been received such as a user device capability selection input 406 or a stored information selection input 408.

If such user inputs 406, 408 have not been received within a specified time period 410, the P2P client generates a device-specific P2P query 412 by retrieving the device capability information from the memory 308 and appending the device capability information to the generated P2P search query. The device-specific P2P query is then provided 414 to the transceiver circuitry 304 for transmission to the P2P network 100.

Processing then awaits reception of remotely filtered search query results 416 within a specified time period 418. If no filtered search queries are timely received 418, the user is notified 420 and processing returns to await notification of a next search query 402. Alternatively, after user notification 420, processing could await a user response indicating a request to extend the time period for awaiting the search query results.

When the remotely filtered search query results are received 416, information concerning the results is presented to the user 424 and the results are stored 426 in the memory 308. Processing then returns to await notification of a next search query 402.

Notification 406 that a negative user device capability selection input has been received by the controller 306 results in providing the generated P2P search query 428 to the transceiver circuitry 304 for transmission to the P2P network 100 without appending any device specific information thereto. Processing then awaits reception of the search query results 416 in a timely manner 418 and subsequent appropriate notification to the user 420, 424 before returning to await notification of a next search query 402.

When a stored information selection input is received 408, selected device capability information is retrieved 426 from the memory 308. The selected device capability information is selected in response to the stored information selection input. The P2P client then generates a device-specific P2P query 412 by appending the selected device capability information to the generated P2P search query. The device-specific P2P query is then provided 414 to the transceiver circuitry 304 for transmission to the P2P network 100. Processing then awaits reception of the search query results 416 in a timely manner 418 and subsequent appropriate notification to the user 420, 424 before returning to await notification of a next search query 402.

In accordance with the flowchart 400 of the embodiment of the present invention, the P2P client 330 directly integrates metadata corresponding to the device capabilities 412 within each search query, unless selected otherwise 406, 408. In this manner, the remote filtering of the search queries can accommodate the many restrictions of wireless communication devices 102 such as limitations on network bandwidth, memory, processing capacity and battery life thereof. Thus, operation in accordance with the embodiment of the present invention guarantees that a file, whether audio, video, image or application, requested by the wireless communication device 102 and coming from a P2P network 100 is adapted for the wireless communication device 102 and the processing time and the battery consumption are optimized, thereby significantly increasing the user experience.

Figure 5:
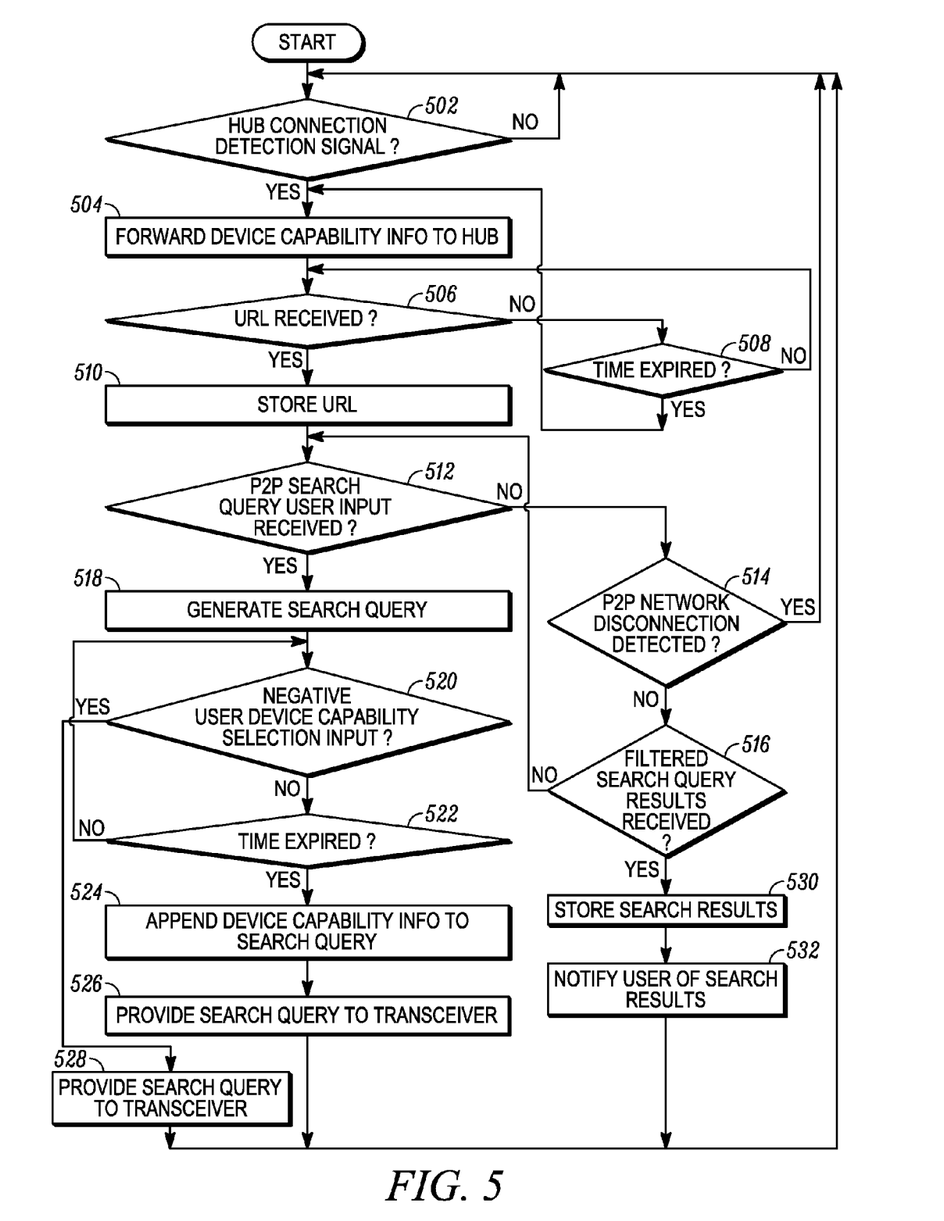
FIG. 5 is a flow diagram of a P2P search query operation of a P2P client of the wireless communication device of FIG. 3 in accordance with an alternate embodiment of the present invention.

Referring to FIG. 5, a flowchart 500 is shown of an alternate embodiment of the present invention. When the P2P client 330 receives a hub detection signal 502 from the P2P hub connection detector 332 indicating that the wireless communication device 102 has connected to a P2P network 100, the P2P client 330 retrieves the device capability information from the memory 308 and provides the device capability information 504 to a hub 104 (FIG. 1) of the P2P network 100. In accordance with this alternate embodiment of the present invention, the device capability information is provided as metadata subpackets integrated into a Local Node Information (LNI) message provided to a hub when connecting to a P2P network 100. The hub 104 stores the device capability information at a location identified by a Uniform Resource Locator (URL) in order to append the subpackets identifying this information to search queries from the wireless communication device 102.

Processing at the wireless communication device 102 awaits reception of the URL 506 within a predetermined time period 508. If the time period expires 508 without the URL being received 506, processing returns to again provide the device capability information 504 to the hub 104. When the URL is received 506, it is stored 510 in the memory 308 and processing awaits the occurrence of either notification of reception of a P2P search query user input 512, disconnection 514 from the P2P network 100, or reception of remotely filtered search results 516.

When the controller 306 provides the P2P client 330 with a user input of a P2P search inquiry 512, the P2P client 330 generates a P2P search query 518 and determines whether a user device capability selection input 520 has been received. If such user input 520 has not been received within a specified time period 522, the P2P client generates a device-specific P2P query 524 by retrieving the URL from the memory 308 and appending the URL to the generated P2P search query. The device-specific P2P query is then provided 526 to the transceiver circuitry 304 for transmission to the P2P network 100. Processing then returns to await the occurrence of either notification of reception of a P2P search query user input 512, disconnection 514 from the P2P network 100, or reception of remotely filtered search results 516.

Notification 520 that a negative user device capability selection input has been received by the controller 306 results in providing the generated P2P search query 528 to the transceiver circuitry 304 for transmission to the P2P network 100 without appending the URL thereto. Processing then awaits the occurrence of either notification of reception of a P2P search query user input 512, disconnection 514 from the P2P network 100, or reception of remotely filtered search results 516.

When the P2P client detects disconnection 514 from the P2P network 100, processing returns to await reception of a subsequent hub connection detection signal 502 indicating that the wireless communication device has reconnected to the P2P network 100. When remotely filtered search query results are received 516, the results are stored 530 in the memory 308 and information concerning the results is presented to the user 532. Processing then returns to await the occurrence of either notification of reception of a P2P search query user input 512, disconnection 514 from the P2P network 100, or reception of another remotely filtered search results 516.

Thus, the alternative embodiment of FIG. 5 replaces the step of appending all device capability information 412 with the step of appending a URL 524 identifying a location within the P2P network where the device capability information of the wireless communication device 102 can be retrieved. When the search query is forwarded to the P2P network 100, the device capability information is retrieved from the URL and appended to the search query, thereby conserving both processing and transmission time for the transmission of the search query within the wireless communication system 200.

The embodiment of FIG. 5 is particularly suited for wireless communication devices 102 with a large amount of device capability information.

In accordance with the embodiments of the present invention described hereinabove, the Gnutella2 P2P client provides a platform for communication within the P2P network 100. Gnutella2 is a P2P client utilizing an extensible binary XML-like packet format. Gnutella2 creates a more robust and complete system for searching by providing a metadata system for more labeling, rating, and quality information to be given in search results than would simply be gathered by file names. While exemplary subpackets for Gnutella2 Local Node Information (LNI) subpackets are described hereinbelow, those skilled in the art will understand that other P2P clients may be utilized and the subpackets, metadata or other appended information for enablement in accordance with the present invention will be structured to conform with the P2P client utilized.

Referring to FIG. 6, exemplary subpackets as appended to LNI messages 504 (FIG. 5) are shown and explained in table 600. In the first column, the subpacket metadata 602 is shown. Next, an overview 604 of the purpose of the subpacket is set out with reasons 606 for using the subpacket described in the third column. The fourth column describes the metadata payload 608 and the last column defines any "children" or further tag information 610 appended to the subpackets to further define them.

As can be seen in the table of FIG. 6, the device capability information specifies limitations on media and applications which can be utilized by the wireless communication device 102 as well as limitations 612 on the codecs with which the wireless communication device 102 can decode search results. The limitations on media range from display limitations on screen size 614, color depth 616 and image pixel size 618 of the display 324 to bit rates of video media 620 and/or the version of Digital Rights Management (DRM) protection 634 that can be displayed on the display 324. The limitations on applications include JAVA versions 622 and operating systems 624 supported by the wireless communication device 102 and whether the applications require keypads 328 or touchscreen 324 hardware inputs 626, cameras 320 or cameras 320 of a specified resolution 628, vibrators 322 (630), and/or GPS capabilities 632.

With the Gnutella2 subpacket information 602, the filtering of the search queries can be performed remote from the wireless communication device 102 thereby conserving both processing and transmission power as well as reducing storage area needed for the storage of search results. Thus it can be seen that a method and apparatus for automatically filtering P2P network 100 searches such that all files downloaded to a client device 102 can be accessed (e.g., played or viewed) by a user of that device while advantageously preserving valuable battery life, network bandwidth and/or processing capacity.

While at least one exemplary embodiment has been presented in the foregoing detailed description of the invention, it should be appreciated that a vast number of variations exist. For example, the hub 104 can be programmed to, once the device capability information of the client device 102 has been uploaded thereto 504, automatically append such device capability information at the hub 104 if it has not been appended to the search query 524 by the client device 102, thereby assuring that the search query will not provide files to the client device 102 that are user inaccessible on the client device 102. In addition, while the alternate embodiment of the present invention disclosed in FIG. 5 appends a URL to the search query 524 as described above, the client device 102 could alternatively permit the user to specify which device capability information to append to the search query instead of the URL. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims.

The invention claimed is:

1. A method in a peer-to peer (P2P) network for filtering a peer-to-peer search query in response to device capability information, the method comprising:
   generating a P2P search query via a P2P peer device in the P2P network;
   providing the P2P search query to the P2P network via the P2P peer device;
   receiving the P2P search query via a P2P super peer device in the P2P network;
   retrieving device capability information for the P2P peer device via the P2P super peer device;
   generating a device-specific P2P search query via the P2P super peer device comprising the P2P search query and the retrieved device capability information;
   providing the device-specific P2P search query to the P2P network via the P2P super peer device; and
   filtering search query results remotely from the P2P peer device in response to the device-specific P2P search query to generate filtered search query results for providing to the P2P peer device.

2. The method of claim 1, wherein the P2P search query comprises a Gnutella2 formatted search query, and wherein the device capability information comprises a Gnutella2 formatted subpacket.

3. The method of claim 2, wherein generating the device-specific P2P search query via the P2P super peer device comprises utilizing the P2P-super peer device to integrate metadata comprising the device capability information into the P2P search query to generate the device-specific P2P search query.

4. The method of claim 2, wherein the P2P-super peer device comprises a P2P hub, and wherein the method further comprises, before generating the P2P search query, sending a local node information (LNI) message to the P2P hub in response to connecting to the P2P hub, the LNI message including the device capability information, and wherein generating the device-specific P2P search query via the P2P-super peer device comprises utilizing the P2P hub to integrate metadata comprising the device capability information into each P2P search query from the P2P-peer device to generate the device-specific P2P search query.

5. The method of claim 4, wherein filtering the search query results comprises utilizing the P2P hub to filter search query results in response to the device-specific P2P search query to generate filtered search query results for providing to the P2P peer device.

6. The method of claim 1, wherein remotely filtering the search query results comprises:
   propagating the P2P search query to a plurality of remote peer devices in the P2P network; and
   when the plurality of remote peer devices return search query results to the P2P-super peer device:

filtering the search query results via the P2P-super peer device in response to the device-specific P2P search query to generate the filtered search query results for providing to the P2P-peer device.

7. The method of claim 1, wherein the device capability information comprises a capabilities description file locatable at a uniform resource locator (URL) address, wherein generating the P2P search query via the P2P-peer device comprises appending the URL address to a search query to generate the P2P search query, and wherein filtering the search query results comprises:
retrieving the device capability information for the P2P-peer device via the P2P-super peer device in response to the URL address to generate the device capability information.

8. The method of claim 1, wherein generating the P2P search query comprises generating the P2P search query including a user device capability information selection input.

9. The method of claim 1, wherein the device capability information comprises stored information of device specific data including codec information, screen size information, color depth information, maximal image size information, maximal bit rate information, JAVA version information, operating system information, input device type information, camera resolution information, vibrator activation information, global positioning system (GPS) capability information, Digital Rights Management version information, or any combination thereof.

10. The method of claim 9, wherein generating the P2P search query comprises generating the P2P search query including a stored information selection input by appending selected portions of the device capability information, and wherein the selected portions of the device capability information is selected in response to the stored information selection input.

11. A method, comprising:
receiving a peer-to peer (P2P) search query over a P2P network via a first P2P electronic device;
determining device capability information for one or more external electronic devices based on the P2P search query;
generating a device-specific P2P search query for the one or more external electronic devices via the first P2P electronic device, wherein the device-specific P2P search query comprises the P2P search query and the device capability information;
performing a search based on the device-specific P2P search query; and
filtering results of the search, wherein filtering the results of the search comprises extracting search results corresponding to the device capability information for the one or more external electronic devices.

12. The method of claim 11, wherein receiving the P2P search query comprises receiving a search query generated by a second P2P electronic device.

13. The method of claim 11, wherein determining the device capability information for the one or more external electronic devices comprises determining device capability information for one or more external electronic devices connected to the P2P network.

14. The method of claim 11, wherein filtering the results of the device-specific P2P search query comprises extracting search results corresponding to codec data, resolution data, color depth data, image size data, bit rate data, JAVA version data, operating system data, input device type data, camera resolution data, global positioning system (GPS) capability data, Digital Rights Management version data, or any combination thereof, of the one or more external electronic devices.

15. The method of claim 11, comprising transmitting the search results corresponding to the device capability information over the P2P network.

16. A non-transitory computer-readable medium having computer executable code stored thereon, the code comprising instructions to:
cause a P2P peer device to generate a P2P search query in a P2P network;
cause the P2P peer device to provide the P2P search query to the P2P network;
cause a P2P super peer device in the P2P network to receive the P2P search query;
cause the P2P super peer device to retrieve device capability information for the P2P peer device;
cause the P2P super peer device to generate a device-specific P2P search query comprising the P2P search query and the retrieved device capability information;
cause the P2P super peer device to provide the device-specific P2P search query to the P2P network; and
cause the P2P super peer device to filter search query results remotely from the P2P peer device in response to the device-specific P2P search query to generate filtered search query results for providing to the P2P peer device.

17. The non-transitory computer-readable medium of claim 16, wherein the code comprises instructions to cause the P2P peer device to generate the P2P search query based on a user selection input.

18. The non-transitory computer-readable medium of claim 16, wherein the code comprises instructions to cause the P2P super peer device to generate the device-specific P2P search query by appending portions of the device capability information to the P2P search query.

19. The non-transitory computer-readable medium of claim 16, wherein the code comprises instructions to cause the P2P super peer device to transmit the filtered search query results to the P2P peer device.

20. The non-transitory computer-readable medium of claim 16, wherein the code comprises instructions to cause the P2P super peer device to retrieve device capability information for the P2P peer device based on a uniform resource locator (URL) address.

21. A non-transitory computer-readable medium having computer executable code stored thereon, the code comprising instructions to:
cause a first P2P electronic device to receive a peer-to peer (P2P) search query over a P2P network;
determine device capability information for one or more external electronic devices based on the P2P search query;
cause the first P2P electronic device to generate a device-specific P2P search query for the one or more external electronic devices, wherein the device-specific P2P search query comprises the P2P search query and the device capability information;
cause the first P2P electronic device to perform a search based on the device-specific P2P search query; and
filter results of the search, wherein filtering the results of the search comprises extracting search results corresponding to the device capability information for the one or more external electronic devices.

22. The non-transitory computer-readable medium of claim 21, wherein the code comprises instructions to cause the first P2P electronic device to transmit the search results corresponding to the device capability information over the P2P network.

23. The non-transitory computer-readable medium of claim 21, wherein the code comprises instructions to cause the first P2P electronic device to transmit the search results corresponding to the device capability information over the P2P network to a plurality of remote external electronic devices.

24. The non-transitory computer-readable medium of claim 21, wherein the code comprises instructions to cause the first P2P electronic device to receive the P2P search query from a second P2P electronic device.

\* \* \* \* \*